United States Patent [19]

Rubottom et al.

[11] 4,297,675
[45] Oct. 27, 1981

[54] SUPPLEMENTAL RIGHT TURN SIGNAL FOR SEMITRAILERS

[76] Inventors: Nolan R. Rubottom, 1832 W. Corak, West Covina, Calif. 91790; Jerry W. Fine, 2105 Vallecito Dr., Hacienda Heights, Calif. 91745

[21] Appl. No.: 113,740

[22] Filed: Jan. 21, 1980

[51] Int. Cl.³ .............................................. B60Q 1/00
[52] U.S. Cl. ................................. 340/107; D10/114; 362/61
[58] Field of Search ................. 340/84, 75, 107, 136, 340/138; 362/61, 66; D10/114, 109, 110; 40/556, 590

[56] References Cited

U.S. PATENT DOCUMENTS

| | | | |
|---|---|---|---|
| 1,197,563 | 9/1916 | Stierlin | 340/75 |
| 1,790,583 | 1/1931 | Hildebrant | 340/75 |
| 1,860,179 | 5/1932 | Hike et al. | 340/138 |
| 2,517,173 | 8/1950 | Blazingame | 340/107 |
| 2,758,401 | 8/1956 | Wilson | 340/107 |
| 3,331,957 | 7/1967 | Adams et al. | 362/61 |
| 3,564,497 | 2/1971 | Gazzo | 340/75 |

Primary Examiner—Donald J. Yusko
Attorney, Agent, or Firm—John T. Matlago

[57] ABSTRACT

A supplemental right turn signal is provided for a semitrailer having the forward end thereof pivotally attached to the rear of a tractor. The supplemental right turn signal is held on the face of a vertically disposed support member which is mounted beneath the bed of the chassis of the semitrailer adjacent the right landing gear provided therefor. The support member is held by attaching the top thereof to one of the transverse structural beams supporting the bed of the semitrailer and by attaching the bottom thereof to the lower end of a bracket, the upper end of which is attached to the next forward transverse structural beam.

5 Claims, 7 Drawing Figures

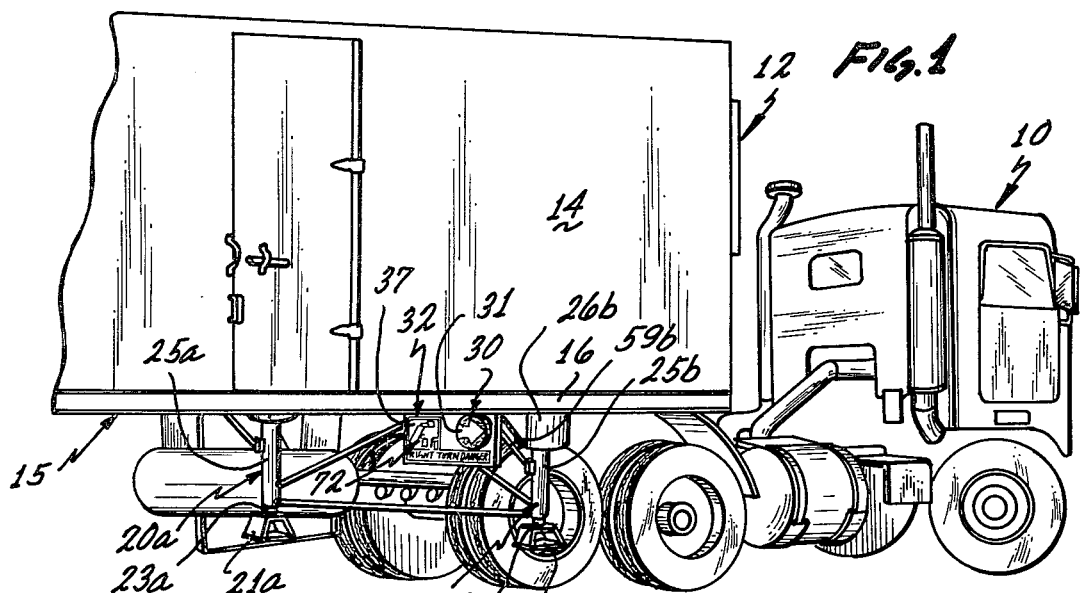
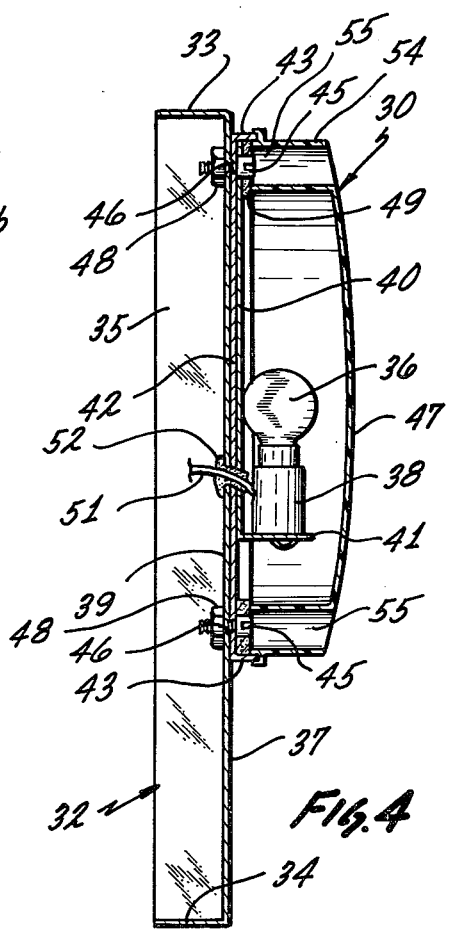
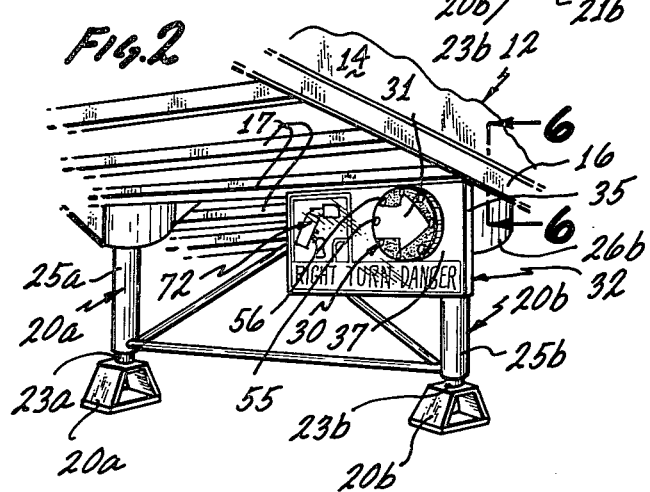
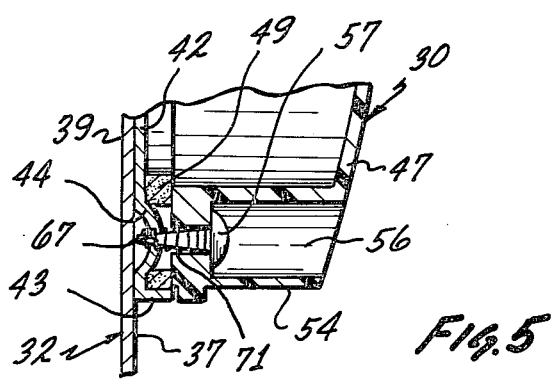

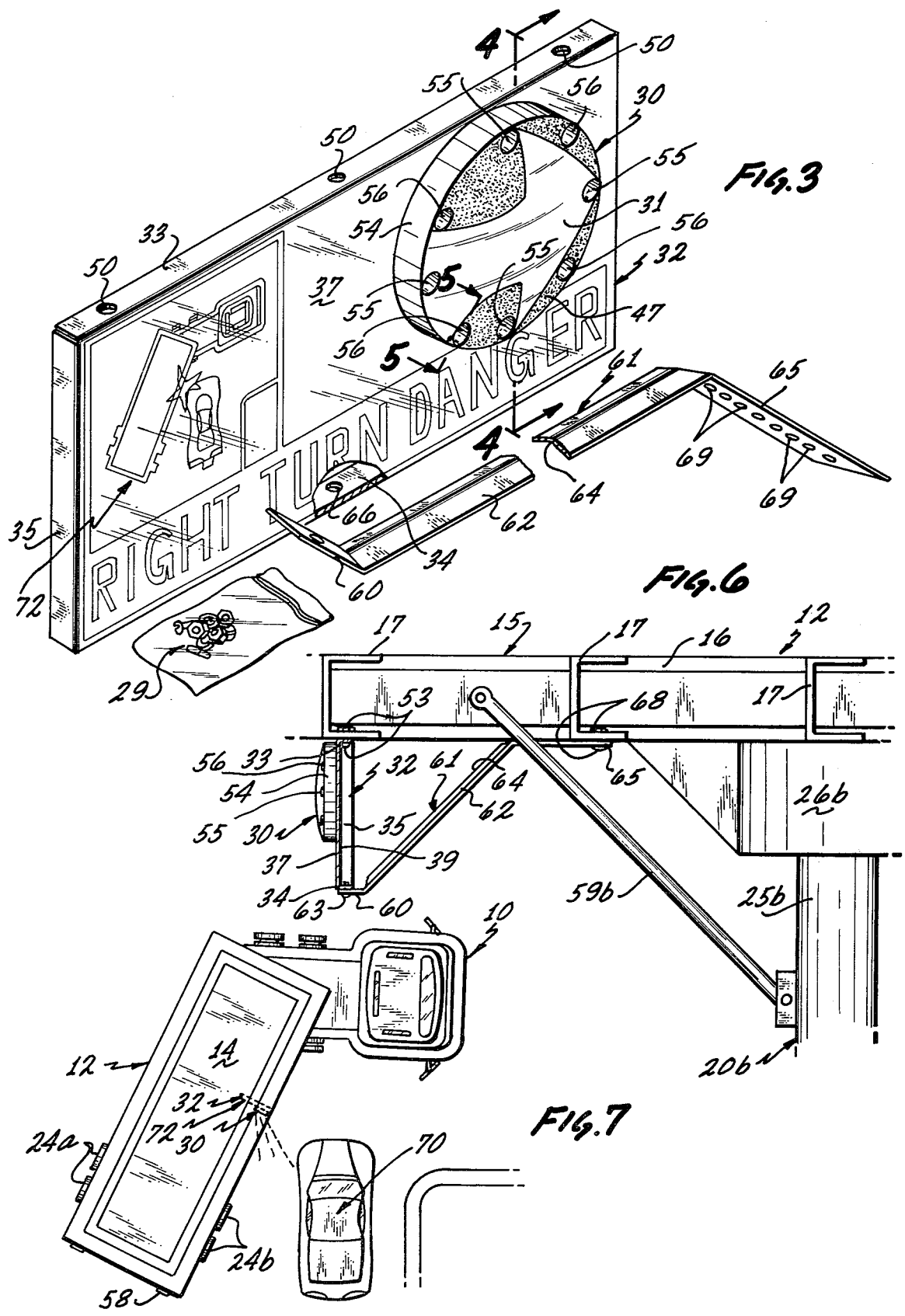

SUPPLEMENTAL RIGHT TURN SIGNAL FOR SEMITRAILERS

BACKGROUND OF THE INVENTION

This invention relates to trucks of the type including a semitrailer that is pulled by a tractor and more particularly to a supplemental right turn signal especially adapted to be mounted for use on such a semitrailer.

Semitrailers are used for carrying all types of goods to wholesale and retail outlets located within a community. When parked at a site to be loaded or unloaded, the semitrailer is supported by wheels on the rear thereof and a pair of landing gears near the forward end thereof. When this semitrailer is to be moved, the rear of a tractor is pivotally attached to the forward end of the semitrailer and the pair of landing gears are telescopically shortened so that the forward end of the semitrailer is supported on the rear wheels of the tractor.

Inasmuch as the body of the semitrailer is a rather long and high box-like enclosure anchored on a similarly long chassis, the driver of the tractor must use undue caution in pulling the semitrailer around a right angled corner on a surface street such as at an intersection. In particular, since the tractor which is pivotally attached to the forward end of the semitrailer is much shorter than the semitrailer, the path of the tractor around the corner is much more of a curve than that of the semitrailer. Thus, it is necessary for the driver of the tractor to approach the intersection in the curb lane and then swing to the second lane, so that when he makes the right hand turn, the semitrailer can follow a path substantially corresponding to a chord of the curved path of the tractor. In other words, during the course of making the turn, the right side of the semitrailer makes a reentry into a portion of the area of the curb lane prior to again becoming aligned with the path of the tractor as it completes the turn and proceeds down the street.

While the semitrailer is in the second lane as the driver of the tractor slowly starts the turn, a motorist may be approaching in the curb lane and seeing that it is open opposite the semitrailer will advance his vehicle up to the intersection. It is to be noted that the motorist will advance his vehicle in this manner even though he may be made aware that the driver of the tractor is planning to make a right hand turn as evident by the blinking of the conventional right turn signal on the back of the semitrailer. What most motorists are not aware of is that as the tractor continues to advance around the corner, the adjacent right side of the semitrailer being pulled thereby will more inwardly into the curb lane and ram into their vehicle causing severe damage.

It should be appreciated that the trucker is seated on the left side of the cab of the tractor and although he has a right side view mirror on the cab which enables him to rearwardly view the area opposite the right side of the semitrailer when the latter is aligned with the tractor, once the tractor starts to make the turn, this side view mirror is of no use in this respect. Thus, the driver of the tractor continues his turn not knowing that a vehicle has entered into the curb lane in the area adjacent the right of the semitrailer, thereby resulting in the aforementioned collision.

SUMMARY OF THE INVENTION

In accordance with the present invention, a supplemental right turn signal is provided for a semitrailer having the bed of the chassis thereof formed of transverse structural beams and having a pair of landing gears attached beneath the front end thereof. The supplemental turn signal is mounted on the face of a vertically disposed support member formed of a rectangularly shaped piece of thin sheet metal having its top, bottom and side marginal edges bent back to provide for the stiffening thereof. The support member has a socket for a light bulb mounted on the upper right half portion of the face thereof. A translucent light cover having portions of the face thereof made non-translucent to define an arrow encloses the light bulb. The words RIGHT TURN DANGER are printed across the lower portion of the face of the support member with the word DANGER located below the light cover. A depiction of a tractor starting to pull a semitrailer around a right angled corner and colliding with a vehicle near the right side of the semitrailer is provided on the upper left portion of the face of the support member. Attachment means are provided for attaching the support member by way of its top marginal edge to a transverse structural beam adjacent to the pair of landing gears. Attachment means are also provided for attaching the lower horizontal end portion of a bracket to the center of the bottom marginal edge of the support member and for attaching the upper horizontal end portion of the bracket to the next forward transverse structural beam.

Accordingly, one of the objects of the present invention is to provide a supplemental right turn signal with a sign for a semitrailer for use in warning a motorist whose vehicle happens to be moving into the adjacent lane along side the semitrailer that the driver of the tractor pulling the semitrailer is planning to make a right angled turn which will bring the side of the semitrailer into the lane being occupied by the vehicle.

Another object of the present invention is to mount a supplemental right turn signal at a location on a semitrailer where it is most effective in warning a motorist positioned adjacent the right side of the semitrailer at an intersection that the driver of the tractor pulling the semitrailer is planning to make a right turn.

Still another object of the present invention is to provide a supplemental right turn signal for semitrailers and mounting apparatus therefor which is inexpensive and easy to install thereon.

With these and other objects in view, the invention consists of the construction, arrangement and combination of the various parts of the device whereby the objects contemplated are attained as hereinafter set forth, pointed out in the appended claims and illustrated in the accompanying drawings.

BRIEF DESCRIPTION OF THE DRAWINGS

FIG. 1 is an overall perspective view of a tractor attached to pull a semitrailer having mounted thereon the supplemental right turn signal in accordance with the present invention;

FIG. 2 is a partial perspective view looking upwardly to the bottom of the chassis of the semitrailer showing the apparatus for mounting the supplemental right turn signal thereon;

FIG. 3 is an enlarged perspective view showing the support member for the supplemental right turn signal of the present invention together with a bracket and a package of nuts and bolts used for mounting it on a semitrailer;

FIG. 4 is a sectional view taken along line 4—4 of FIG. 3;

FIG. 5 is a fragmentary sectional view taken along line 5—5 of FIG. 3;

FIG. 6 is a side view of the semitrailer as taken along line 6—6 of FIG. 2; and

FIG. 7 diagrammatically illustrates a tractor pulling a semitrailer about a right angled corner and making use of the supplemental right turn signal thereon to warn a motorist whose vehicle is approaching the right side of the semitrailer of impending danger.

DETAILED DESCRIPTION OF THE PREFERRED EMBODIMENT

Referring to FIG. 1 of the drawings, a tractor 10 is shown attached to a semitrailer 12 by a conventional pivotal attachment (not shown). The semitrailer 12 comprises a long, high, rectangular box-like enclosure 14 anchored on the bed 16 of a similarly long chassis 15. The bed 16 of chassis 15, as illustrated in FIGS. 2 and 6, is constructed of a plurality of spaced transverse structural beams 17. The structural beams 17 are shown as having the shape of a C channel but they may have any other structural shape such as an I beam.

Located inwardly from the front end of the semitrailer 12 near each side thereof are landing gears 20a and 20b. Each landing gear, such as the right landing gear 20b, is provided with a support shoe 21b attached to a lower tubular member 23b which telescopically fits in an upper tubular member 25b. The pair of landing gears 20a and 20b are shortened by telescoping their respective lower tubular members 23a and 23b into the upper tubular members 25a and 25b by use of a mechanical crank (not shown) when the semitrailer 12 is attached to be pulled by the tractor 10. When the tractor 10 is detached from the front of the semitrailer 10, the pair of landing gears 20a and 20b are similarly telescopically extended to support the front of the semitrailer 12 at the same level as the dual wheels 24a and 24b on the rear thereof (FIG. 7). As shown in FIG. 1, a support member 32 for a supplemental turn signal 30 in accordance with the present invention is mounted below the bed 16 of the semitrailer 12 just behind the right landing gear 20b.

Referring to FIG. 3, the support member 32 is a vertically disposed rectangular thin piece of sheet metal which is approximately twice as long as it is high. The top marginal edge 33, bottom marginal edge 34, and the side marginal edges 35 of support member 32 are bent back at 90 degrees for the purpose of stiffening the face 37 thereof.

As shown in FIG. 4, which is a vertical sectional view as taken along line 4—4 of FIG. 3, a circular sheet metal base 42 having a short peripheral edge wall 43 is disposed against the face 37 of the support member 32 near the upper right portion thereof. The base 42 is attached by bolts 45 passing through four equally spaced openings 46 provided therein just inward of the peripheral edge wall 43 thereof and engaging nuts 48 on the rear surface 39 of the support member 32. A vertically disposed narrow metal strip 40 is held in position flat against the face 37 of support member 32 by the top bolt 45. The lower end portion 41 of the narrow strip 40 is bent horizontally for supporting a socket 38 for a light bulb 36. The light bulb 36 is thus held in the center of the circular base 42. The electrical leads 51 of the light socket 38 pass through openings in the base 42 and support member 32 so as to extend out of the back of the latter. A sealant 52 provides for sealing the openings through which the leads 51 extend. The metal base 42 is also provided with four rounded projections 44 (FIG. 5) near the peripheral edge wall 43 thereof spaced intermediate the openings 46. Each projection 44 has a small hole 67 in the center thereof.

A foam rubber gasket 49 lies within the base 42 so as to fit within the peripheral edge wall 49 thereof. A translucent plastic circular light cover 47 is provided with a short cylindrical wall 54 adapted to fit within the peripheral edge wall 43 of base 42 so as to enclose the light bulb 36. The light cover 47 is provided with four equally spaced hollow bosses 55 adjacent the inner cylindrical wall 54 thereof the bottoms of which are open and aligned so as to freely fit over the heads of bolts 45. The light cover 47 is also provided with four equally spaced hollow bosses 56 (FIG. 5) adjacent the inner cylindrical wall 54 thereof which are aligned with the spaced rounded projections 44 on the base 42. The bottom walls of bosses 56 are provided with holes 71 for receiving the threaded ends of the screws 57 which provide for attaching the light cover 47 to the base 42, which as previously described is attached, in turn, by bolts 45 to the support member 32. The outer edge of the cylindrical wall 54 of circular light cover 47 thus bears against the gasket 49 to prevent moisture from entering the enclosure formed by the light cover 47. It should now be appreciated that the circular light cover 47 is mounted so that it can be easily removed from the circular base 42 by disengaging the four screws 57 to thereby enable the changing of the light bulb 36. The light cover 47 which is preferably formed of a orange colored plastic material has portions of the inner face thereof molded flat and covered with pieces of black plastic material which adhere thereto and provide for the remaining portions of the face of the cover to define an arrow 31 pointing horizontally to the right when viewed from the rear side of the semitrailer 12.

The support member 32 with the supplemental turn signal 30 assembled on the face thereof, the bracket 61, and a bag 29 of nuts and bolts for mounting the support member 32 on the bottom of the bed 16 of the semitrailer chassis 15, are illustrated in FIG. 3. The bent top marginal edge 33 of the support member 32 is provided with three spaced holes 50 for attaching it by three nuts and bolts 53 (FIG. 6) to the lower flange of the transverse channel beam 17 on the bottom of the bed 16 which is just to the rear of the brace 59b provided for the landing gear 20b. The bracket 61 provides for supporting the support member 32 and includes a lower horizontal end portion 60 which is attached by a single bolt 63 which passes through a hole therein and the center hole 66 on the bottom marginal edge 34 of the support member 32 and is held by its accompanied nut. The upper horizontal end portion 65 of the bracket 61 is attached by a single bolt 68 which passes through a hole 69 therein and a hole in the flange of the next forward channel beam 17 behind the gusset plate 26b provided for the landing gear 20b. The bolt 68 is held by the nut provided therefor.

Inasmuch as the spacing of adjacent transverse channel beams 17 on the semitrailer bed 15 is not standarized, the upper horizontal end portion 65 of the bracket 61 is provided with a series of spaced holes 69 so that the bracket 61 can accomodate various spacings of the channel beams 16. The angular portion 62 of the bracket 61 is provided with a central bend 64 along its length to provide for the stiffening thereof. It should be appreciated that when the tractor 10 is pulling the semitrailer 12 along a highway at top speed, a large wind force is applied against the back surface 39 of the support member 32 which is facing the direction of travel. This force tends to swing the bottom end of the sheet support member 32 about the upper marginal edge 33 thereof which is anchored by the three nut and bolts 53 to the lower flange of one of the channel beams 17. Thus, it is for this reason that the lower end portion 60 of bracket 61 is attached to the center hole 66 (FIG. 3) of the bent bottom marginal edge 34 of the support member 32.

It should now be particularly noted that the support member 32 is mounted adjacent to the back side of the landing gear 20b of the semitrailer 12 with the plane of the face 37 thereof perpendicular to both the vertical plane of the side of the semitrailer 12 and the horizontal plane of the bed 16 of the chassis 15 thereof. For best visibility, the support member 32 is mounted with the outside thereof substantially flush with the extreme outside right edge of the semitrailer 12, but not beyond.

As illustrated in FIG. 3, a depiction 72 of the nature of the impending danger, i.e., a showing (FIG. 7) of a tractor 10 turning a right corner with a vehicle 70 positioned adjacent the semitrailer 12 being pulled by the tractor 10, is placed on the upper inner portion of the face 37 of the support member 32. Across the lower portion of the face 37 of the support member 32 the words RIGHT TURN DANGER are printed in bold letters. It should be noted that by having the cylindrical walls 54 of the light cover 47 extending outwardly from the face 37 of the support member 32, some of the light radiating therefrom will be directed downwardly so as to light up the word DANGER printed directly therebelow.

As shown in FIG. 7, when a driver of the tractor 10 pulling the semitrailer 12 is positioned on the street at a corner where he wants to make a right hand turn, he will turn on the right hand turn indicator in his cab which will cause the right hand turn signal 58 on the rear of the semitrailer 12 to blink as is conventional. The supplemental turn signal 30 installed on the semitrailer 12 beneath the bed 16 of the chassis 15 adjacent to the rear of the landing gear 20b by the use of support member 32 is also electrically connected for this turn indicator in the cab of tractor 10. Thus, this supplemental turn signal 30 will also start to blink and warn the motorist in the vehicle 70 adjacent the side of the semitrailer 12 that he is in danger and that he should take some type of evasive action, stop his vehicle, or, if he has already driven into the danger zone, honk his horn to advise the tractor driver of his location and to back up if possible. It should be appreciated that mounting the support member 32 for the turn signal 30 just behind the right landing gear 20b locates it so that it will be in front of and easily seen by the motorist whose vehicle has moved into position adjacent the side of the semitrailer 12.

While the preferred embodiment of the device as described herein is well adapted to fulfill the objects and advantages previously mentioned as desirable, it is to be understood that the invention is not limited to the specific features shown and described but that the means and configuration herein disclosed are susceptible of modification in form, proportion and arrangement of parts without departing from the principles involved or sacrificing any of its advantages and the invention is therefore claimed in embodiments of various forms all coming within the scope of the claims which follow.

What is claimed is:

1. A supplemental right turn signal unit for mounting on a semitrailer having the bed of the chassis thereof supported by spaced transverse structural beams and having a pair of landing gears attached to the bottom of the bed of said chassis inward of the front end thereof, said signal unit comprising:

a vertically disposed rectangular sheet metal support member having its marginal top, bottom and side edges bent back at right angles to the surfaces thereof;

a socket for a light bulb mounted on the upper right portion of the surface of said support member;

a translucent cover enclosing said light bulb, said cover having portions of the face thereof made non-translucent to define an arrow pointing to the right side of the support member, and said cover having a translucent cylindrical sidewall disposed normal to the surface of said support member whereby light emitted by said light bulb can radiate sidewardly and downwardly to illuminate indicia including a pictorial indication of the impending danger provided on the left and bottom portion of the surface of said support member;

a bracket having an angular intermediate portion with a horizontal lower end portion and an elongated horizontal upper end portion; and attachment means for attaching said support member beneath the bed of the semitrailers so that the right side thereof is aligned with the sidewall of said semitrailer by attaching the top marginal edge thereof on a transverse structural beam located to the rear and adjacent to the pair of landing gears and by attaching the horizontal lower end portion of said bracket to the bottom marginal edge of said support member and the horizontal upper end portion of said bracket to the next forward transverse structural beam.

2. A supplemental right turn signal unit as defined in claim 1 wherein said bracket is formed of a strip of sheet metal and the intermediate angular portion of said sheet metal bracket is stiffened by providing a bend along the longitudinal center thereof.

3. A supplemental right turn signal unit as defined in claim 2 wherein said elongated horizontal upper end portion of said bracket is provided with a series of holes spaced therealong to accomodate various spacings of said transverse structural beams.

4. A supplemental right turn signal unit as defined in claim 1 wherein said light bulb is electrically connected to the turn indicator provided within the cab of a tractor provided for pulling said semitrailer.

5. A supplemental right turn signal unit for mounting on a semitrailer having a pair of landing gears attached to the bottom of the bed thereof inward of the front end thereof, said signal unit comprising:

a support member having an enlarged flat surface;

said support member having provided on the surface thereof a depiction of a semitrailer-tractor making a right hand turn and colliding with a vehicle located in the right hand lane, and the indicia "Right Turn Danger";

a socket for a light bulb mounted on the surface of said support member;

a translucent cover enclosing said light bulb;

said cover having portions of the face thereof made non-translucent to define an arrow pointing to the right side of the support member;

said cover having a translucent cylindrical sidewall disposed normal to the surface of said support member whereby light emitted by said bulb can radiate outwardly through said sidewall to illuminate the depiction and indicia on the surface of the support member; and means for mounting said support such that it depends beneath the bed of said semitrailer to the rear of and adjacent to the pair of landing gears with said flat surface on said support member vertically disposed and normal to the longitudinal axis of said semitrailer and with the right side of said support member substantially aligned with the right sidewall of said semitrailer.

* * * * *